United States Patent [19]
Shibata
[11] 4,388,629
[45] Jun. 14, 1983

[54] NOTE-PAPER SHEET ISSUANCE DEVICE

[75] Inventor: Seiichi Shibata, Nirasaki, Japan
[73] Assignee: Casio Computer Co., Ltd., Tokyo, Japan

[21] Appl. No.: 210,411
[22] Filed: Nov. 25, 1980

[30] Foreign Application Priority Data
Nov. 30, 1979 [JP] Japan ........ 54-155823

[51] Int. Cl.[3] ........ G01D 1/00
[52] U.S. Cl. ........ 346/81; 346/93
[58] Field of Search ........ 346/19, 20, 59, 60, 346/78, 79, 80, 81, 93

[56] References Cited
U.S. PATENT DOCUMENTS
3,725,947 4/1973 Albertini ........ 346/33 R
4,283,769 8/1981 Asada ........ 346/20 X

*Primary Examiner*—Joseph W. Hartary
*Attorney, Agent, or Firm*—Frishauf, Holtz, Goodman & Woodward

[57] ABSTRACT
In a small-sized electronic apparatus having at least a time counting circuit and a printing section, when a note-paper sheet issuance key is operated a note-paper sheet, on which the present time data is printed and also which has a blank space of predetermined size, is issued.

11 Claims, 4 Drawing Figures

NOTE-PAPER SHEET ISSUANCE DEVICE

BACKGROUND OF THE INVENTION

In our daily life, there often occurs an occasion when one responds to a telephone call addressed to an absent person and writes a message of the calling person on note-paper. When writing such a message, it is usual to also write the time of reception of the call on the same note-paper. However, it is quite often the case to neglect or forget to write the time of reception of the message. In such a case, the value of the message as such is sometimes reduced. In addition, it sometimes takes time to find a sheet of note-paper on which to write a message, and also without any definite format of the note-paper some wasteful time is involved when reading the written message.

An object of the invention is to provide an apparatus which can automatically issue a note-paper sheet, on which the present time data is printed and also which has a blank space for writing a message or the like thereon, in response to the operation of a note-paper sheet issuance key.

SUMMARY OF THE INVENTION

To achieve the above object, the note-paper sheet issuing apparatus according to the invention comprises a keying section having a note-paper issuance key, a central processing unit connected to the keying section, a time counting circuit connected to the central processing unit for automatically renewing the present time data such as present hour and minute data, and a printing section connected to the central processing unit and serving to print the present time data at the time when the note-paper sheet issuance key is operated and also feeding the sheet by a predetermined number of lines for providing a blank space before the start of or after the end of the printing operation.

With the above construction, it is possible to provide a note-paper sheet with the present time data printed thereon by a one-touch keying operation. Thus, when the invention is applied to a table telephone set with a printer, in the case of taking a memo of a telephone message, a note-paper sheet with the present time data printed thereon and having a blank space for writing the message can be obtained from the table telephone set on a desk by a one-touch keying operation. This is very convenient. In addition, the time for writing the time data of the instant of reception of the message can be saved, and also there is no possibility of neglecting the writing of the time data. Further, since the note-paper sheet has a definite formula or format, the content written on the sheet can be readily read out.

This invention can be more fully understood from the following detailed description when taken in conjunction with the accompanying drawings.

DETAILED DESCRIPTION

Figure 1:
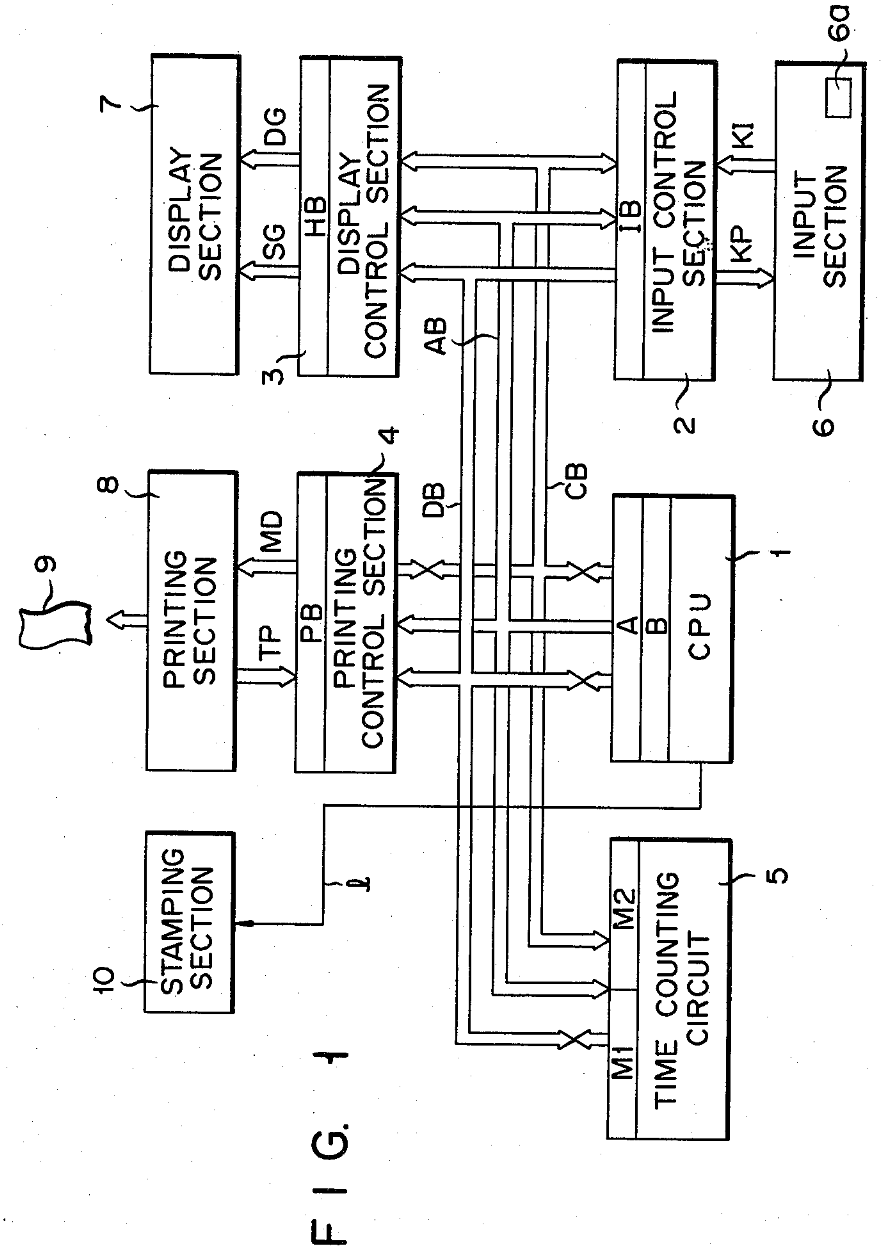
FIG. 1 is a block diagram showing a printing calculator.

Now, an embodiment of the invention will be described with reference to FIGS. 1 through 4. FIG. 1 outlines the construction of a printing calculator. In FIG. 1, a central processing unit (CPU) includes a control section, in which various microcommands are stored, and an arithmetic section for effecting summing and subtracting operations. CPU 1 also includes various registers such as A and B registers for temporarily memorizing data at the time of display, printing, transfer and arithmetic processing of data. An input control section 2, a display control section 3, a printing control section 4 and a time counting circuit 5 are connected to the CPU 1 through a data bus DB, an address bus AB and a control bus CB. The input control section 2 includes an input buffer IB for temporarily memorizing input data. This input control section 2 provides a timing signal KP to an input section 6, and when a keying operation is done in the input section 6 the timing signal is selectively fed as a keyed input signal to the input buffer memory IB of the input control section 2 according to the operated key. The input section 6 is provided with ten keys for coupling numerical values "0" to "9" and function keys for coupling arithmetic instructions as well as a note-paper issuing key *6a* which is operated when issuing a note-paper sheet.

The display control section 3 includes a display buffer HB. Segment signal SG, obtained as a result of decoding of display data in the display buffer HB, is applied together with digit signal DG to a display section 7. In the display section 7, numeral data or the like are digitally displayed according to the input signal.

The printing control section 4 includes a printing buffer PB for detecting the coincidence of printing data in the printing buffer 4 and printing position signal TP transferred from a printing section 8, and the result of the detection is supplied as printing drive signal MD to the printing section 8. In the printing section 8, given hammers are driven according to the printing drive signal MD, thus producing a sheet 9, on which numeral data and the like are printed.

The time counting circuit 5 includes a data information memory section $M_1$ for memorizing the data information of the present date, namely year, month and day data thereof, and a time information memory section $M_2$ for memorizing the time information of the present time, namely hour and minute data thereof. The data memorized in the memory sections $M_1$ and $M_2$ are automatically renewed in accordance with the time counting operation performed within the time counting circuit 5.

Designated at 10 is a stamping section. In this section, impressions "From", "To" and "Content of message" are stamped when a stamp drive command is given from the CPU 1 through a line l.

Figure 2:
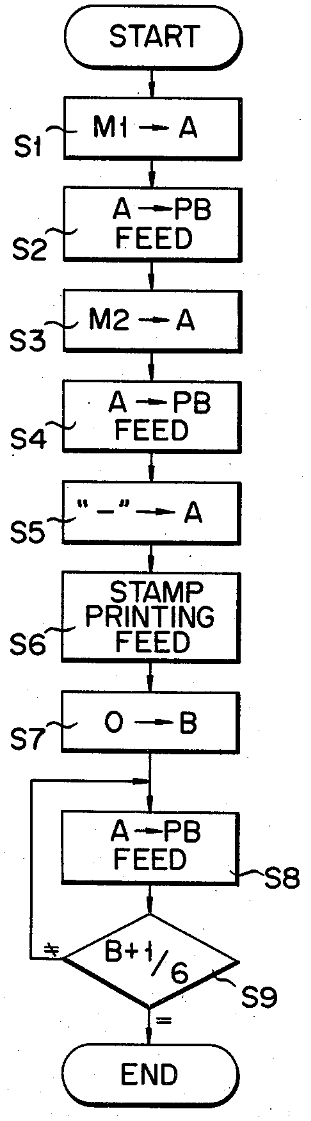
FIG. 2 is a flow chart illustrating the operation of a note-paper sheet issuing apparatus.

The operation of the table telephone set with printer of the above construction for issuing a note-paper sheet will now be described. When a call to an absent person is received and it is necessary to write a message of the calling person on a note-paper sheet, the note-paper sheet issuance key *6a* is operated. As a result, operation as shown by the flow chart of FIG. 2 is executed. In a first step $S_1$, the present date information, i.e., present year, month and day data, memorized in the data information memory section $M_1$ of the time counting circuit 5 are read out and written in the A register in the CPU 1. In the next step $S_2$, the date data written in the A register is transferred to the printing buffer PB in the printing control section 4, and the present date information is recorded on a recording sheet according to printing drive signal MD corresponding to the data in the printing buffer PB and supplied to the printing section 8. Subsequently, the sheet is fed by one line interval. In this step, the present date information, for instance "79.10.26", is printed as shown in FIG. 2. In the following step $S_3$, the present time information, i.e., present hour and minute data, memorized in the time information memory section $M_2$ are read out and written in the A register. In the following step $S_4$, the time data in the A register is transferred to the printing buffer PB, and the present time is printed in the printing section 8. Subsequently, the sheet is fed by one line interval. In this step, the present time information, for instance "13:42", is printed. In the following step $S_5$, a bar code "—" is written in the A register. In the following step $S_6$, a stamp drive command is produced from the CPU 1 and coupled through the line to the stamping section 10, an impression of an underlined space "From", in which to write the surname of the caller, an impression of an underlined space "To", in which to write the surname of the called, and an impression "Content of message" are stamped. At this time, the sheet is fed by one line interval after each impression is stamped. In the following step $S_7$, "0" is written in the B register of CPU 1. In the following step $S_8$, the bar code written in the A register is transferred to the printing buffer PB, and bar codes for one line are printed in the A register. Subsequently, the sheet is fed by one line interval. In the following step $S_9$, the sum of the content of the B register and "1" is taken and written as a new content in the B register, and whether or not the new content is equal to "6", that is, whether or not printing of bar codes for 6 lines has been effected, is checked. If the check yields "yes", the operation of producing a note-paper sheet is ended. If the check yields "no", the operation returns to the step $S_8$ of printing bar codes.

Figure 3:
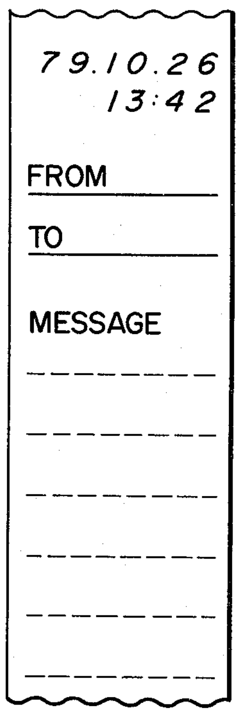
FIGS. 3 and 4 show examples of the format of the note-paper sheet.

In the above way, by operating the note-paper sheet issuance key *6a* once, a note-paper sheet, on which the present date and time data are printed as shown in FIG. 3, and the person who has received the call can write surnames of the calling and called persons in the predetermined spaces.

Figure 4:
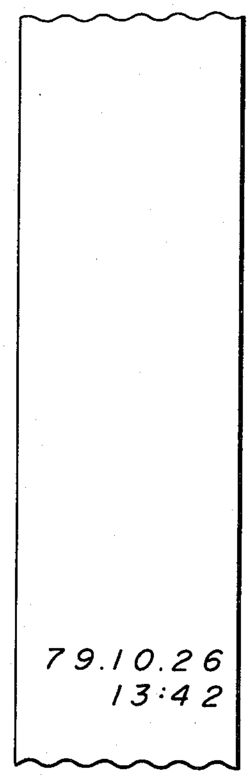

FIG. 4 shows a different example of the format of the note-paper sheet which is issued when the note-paper sheet issuance key *6a* is operated. In this embodiment, with the operation of the key *6a* a sheet is fed to a predetermined extent, and then the date and time data are printed after the blank space thus provided.

It is further possible to adopt various other formats of the note-paper sheet. For example, instead of the format shown in FIG. 3, a blank space may be provided by feeding the sheet by a predetermined interval after the printing of the date and time data. Also, instead of the blank space in the format shown in FIG. 4, the aforementioned stamped impressions of the characters and bar codes may be given.

Further, the content of the stamped impressions in the format of FIG. 3 is by no means limitative, and various stamped impression may be provided depending upon use.

What is claimed is:

1. An apparatus for issuing note-paper sheets of substantially the same predetermined size, comprising:

a keying secton having a note-paper sheet issuance key which is operable to initiate issuance of a note-paper sheet;

a central processing unit coupled to said keying section;

a time counting circuit coupled to said central processing unit for automatically providing at least present time data such as present hour and minute data; and a printing section coupled to said central processing unit;

said central processing unit being responsive to operation of said note-paper issuance key for causing said printing section to perform a printing operation of printing said present time data at a predetermined location on a paper sheet at the time of issuance of a note-paper sheet and also a feeding operation to feed said paper sheet by a predetermined number of lines without printing for said predetermined number of lines for providing a blank message-recording space of predetermined length on said paper sheet before the start of or after the end of the printing operation at the time when said note-paper sheet issuance key is operated, thereby providing a note-paper sheet of substantially the same length each time said note-paper sheet issuance key is operated.

2. The apparatus of claim 1, wherein said time counting circuit automatically renews at least said present time data.

3. The apparatus of claim 2, wherein:

said time counting circuit provides and automatically renews present date data as well as present time data; and said printing section prints said present date data and time data during said printing operation and also feeds said paper sheet by said predetermined number of lines for providing said blank space of predetermined length before the start of or after the end of said printing operation at the time when said note-paper sheet issuance key is operated.

4. The apparatus of claim 1, wherein said printing section includes means for printing said present time data at the time when said note-paper sheet issuance key is operated and means for printing bar codes spaced apart at predetermined lines before the start of or after the end of the printing operation.

5. The apparatus of claim 1, further comprising a stamping section coupled to said central processing unit for providing stamped impressions at predetermined locations on said paper sheet emerging from said printing section.

6. The apparatus of claim 1, wherein:

said keying section includes ten keys for supplying numeral data, and function keys for supplying arithmetic commands at least for addition, subtraction, multiplication and division;

said central processing unit includes means for executing calculating operations, responsive to operation of keys of said keying section; and said printing section includes means for printing numeral data and data corresponding to the results of said calculation operations.

7. An apparatus for issuing note-paper sheets, comprising:

a keying section having a note-paper sheet issuance key which is operable to initiate issuance of a note-paper sheet;

a central processing unit coupled to said keying section;

a time counting circuit coupled to said central processing unit for automatically providing at least present time data such as present hour and minute data;

a printing section coupled to said central processing unit;

said central processing unit being responsive to operation of said note-paper issuance key for causing said printing section to perform a printing operation of printing said present time data on a paper sheet at the time of issuance of a note-paper sheet and also a feeding operation to feed said paper sheet by a predetermined interval without printing for said predetermined interval for providing a blank message-recording space on said paper sheet before the start of or after the end of the printing operation at the time when said note-paper sheet issuance key is operated; and a stamping section coupled to said central processing unit for providing stamped impressions on said paper sheet emerging from said printing section.

8. The apparatus of claim 7, wherein said time counting circuit automatically renews at least said present time data.

9. The apparatus of claim 8, wherein:

said time counting circuit provides and automatically renews present date data as well as present time data; and said printing section prints said present date data and time data during said printing operation and also feeds said paper sheet by said predetermined interval for providing a blank space of predetermined length before the start of or after the end of said printing operation at the time when said note-paper issuance key is operated.

10. The apparatus of claim 7, wherein said printing section includes means for printing said present time data at the time when said note-paper sheet issuance key is operated and means for printing bar codes spaced apart at predetermined lines before the start of or after the end of the printing operation.

11. The apparatus of claim 7, wherein:

said keying section includes ten keys for supplying numeral data, and function keys for supplying arithmetic commands at least for addition, subtraction, multiplication and division;

said central processing unit includes means for executing calculating operations, responsive to operation of keys of said keying section; and said printing section includes means for printing numeral data and data corresponding to the results of said calculation operations.

* * * * *